United States Patent [19]
Gordon et al.

[11] Patent Number: 5,794,825
[45] Date of Patent: Aug. 18, 1998

[54] APPLICATOR FOR LIQUIDS SUCH AS ADHESIVES

[75] Inventors: Fergal Anthony Gordon, Kildare; Martin Justin Fitzpatrick, Dublin, both of Ireland

[73] Assignee: Loctite (Ireland) Limited, Dublin, Ireland

[21] Appl. No.: 519,991

[22] Filed: Aug. 28, 1995

[30] Foreign Application Priority Data

Sep. 6, 1994 [IE] Ireland ................................. 940697

[51] Int. Cl.$^6$ ................................................. B67D 3/00
[52] U.S. Cl. ........................ 222/504; 222/518; 277/135; 277/206 A
[58] Field of Search ........................ 222/504, 509, 222/518, 334, 309, 389, 386, 559; 277/205, 206 A, 206 R, 135

[56] References Cited

U.S. PATENT DOCUMENTS

| | | | |
|---|---|---|---|
| D. 261,400 | 10/1981 | Beall et al. | D19/66 |
| 2,059,706 | 11/1936 | Paasche | 299/140 |
| 2,107,732 | 2/1938 | Gustafsson et al. | 299/140.1 |
| 2,237,842 | 4/1941 | Reynolds | 299/140 |
| 2,252,200 | 8/1941 | Plummer | 299/140.1 |
| 2,296,079 | 9/1942 | Anderson | 299/59 |
| 2,362,834 | 11/1944 | Larson | 299/140 |
| 2,553,401 | 5/1951 | Carr | 137/144 |
| 2,766,484 | 10/1956 | Sanderson | 18/30 |
| 2,913,187 | 11/1959 | Anderson | 239/412 |
| 3,022,955 | 2/1962 | Riddell | 239/456 |
| 3,104,986 | 9/1963 | Goman et al. | 118/2 |
| 3,291,396 | 12/1966 | Walter | 239/412 |
| 3,295,169 | 1/1967 | Moslo | 222/504 |
| 3,412,971 | 11/1968 | McDivitt | 251/137 |
| 3,463,363 | 8/1969 | Zelna | 222/334 |
| 3,622,050 | 11/1971 | Acton et al. | 222/309 |
| 3,624,802 | 11/1971 | Ripert | 251/31 |
| 3,964,644 | 6/1976 | Wallace | 222/146 |
| 3,973,697 | 8/1976 | Crum et al. | 222/47 |
| 4,293,010 | 10/1981 | Winiasz | 222/504 |
| 4,323,177 | 4/1982 | Nielsen | 222/386 |
| 4,375,275 | 3/1983 | Argazzi | 239/117 |
| 4,560,109 | 12/1985 | Teruyuki et al. | 239/583 |
| 4,582,330 | 4/1986 | Lew et al. | 277/206 A |
| 4,801,051 | 1/1989 | Lewis et al. | 222/504 |
| 4,852,773 | 8/1989 | Standlick et al. | 222/504 |
| 4,953,756 | 9/1990 | Breault et al. | 222/309 |
| 5,277,342 | 1/1994 | Dickau et al. | 222/387 |

FOREIGN PATENT DOCUMENTS

| | | | |
|---|---|---|---|
| 0040068 | 11/1981 | European Pat. Off. | B05B 1/32 |
| 0083461 | 7/1983 | European Pat. Off. | B05B 7/04 |
| 0589138 | 3/1994 | European Pat. Off. | F16K 41/00 |
| 32 14 726 A1 | 10/1983 | Germany | B05C 5/02 |
| 2 129 776 | 5/1984 | United Kingdom | G01F 13/00 |
| 2 271 413 | 4/1994 | United Kingdom | F16K 41/00 |

*Primary Examiner*—Phillipe Derakshani
*Attorney, Agent, or Firm*—Steven C. Bauman; Eugene F. Miller

[57] ABSTRACT

An applicator is described which is sealed to a very high degree against any ingress of air and is therefore suitable for use with adhesives which react strongly with air. The applicator comprises a housing (2, 3, 4) having a bore (6) terminating at one end in an outlet aperture (10), a plunger (13, 14, 15, 16, 17, 18, 20) received in said bore (6) and mounted for movement between an open (liquid application) position and a closed position, the rear end (13, 14) of the plunger projecting from the other end (2) of the housing, the plunger including a longitudinal bore (19) for supply of liquid to be applied, the plunger being provided with one or more ports (21) through which liquid may flow from the bore (19) of the plunger into the bore (6) of the housing so arranged that when the plunger is in the fully open position the bore (6) of the housing and the bore (19) of the plunger co-operate to provide a streamlined flow path, means (16, 23, 25) for moving the plunger between the closed position and the open position; and a seal (34, 35, 36) between plunger and housing to prevent ingress of air. The novel features are (a) that the seal is a liquid barrier seal (36) and (b) that in the closed position a forward end (20) of the plunger seals said housing outlet aperture (10) and in the open position the forward end (20) of the plunger (13, 14, 15, 16, 17, 18, 20) is retracted into the housing.

16 Claims, 4 Drawing Sheets

APPLICATOR FOR LIQUIDS SUCH AS ADHESIVES

FIELD OF THE INVENTION

The present invention relates to applicators for liquids which cure on exposure to air, such as adhesives, sealants, etc.

BACKGROUND ART

A variety of different constructions of applicator are described in the literature. By way of example only, descriptions of applicators may be found in U.S. Pat. No. 2,296,079 to H. Anderson, U.S. Pat. No. 3,104,986 to R. L. Goman, U.S. Design Pat. No. 261,400 to Beall et al., U.S. Pat. No. 4,375,275 to Argazzi, DE 3,214,726 A1 in the name Scheithauer, U.S. Pat. No. 4,953,756 to Breault and Dickau and U.S. Pat. No. 5,277,342 to Dickau.

Dickau describes an applicator comprising a cylindrical housing in which a cylindrical slide is mounted. The housing includes a liquid adhesive reservoir which is supplied with pressurized liquid adhesive. A longitudinal passage or bore extends through the slide for supplying fluid from an external supply to the reservoir. A bellows seal is employed for sealing off an actuating mechanism from the reservoir. The bellows seal is connected between the slide and a support fixedly mounted to the housing. A valve mechanism is provided at one end of the housing for controlling the flow of liquid adhesive from the reservoir. The valve mechanism is responsive to the slide and opens in a downstream direction to allow pressurized liquid adhesive to enter a funnel shaped nozzle through which the liquid adhesive is applied.

Scheithauer describes an applicator including a barrel, a plunger movable within the barrel, the plunger including a longitudinal bore for flow of liquid, a streamlined flowpath along the bore of the plunger and into a nozzle region, a pneumatic drive for moving the plunger, and seals between barrel and plunger. The applicator is intended for application of a heated hot melt adhesive, and is particularly intended to maintain the adhesive at a uniform temperature so as to ensure controlled application, allowing a thin layer of adhesive to be applied. In order to effect heating the barrel is relatively long and a heating element is wound externally on the barrel. The plunger consists of two tubular sections joined end to end with the joint located in the region of the pneumatic drive. The seals between the barrel and plunger consist of two U-seals, one upstream of the joint and the pneumatic drive and one downstream of the joint and pneumatic drive. The conical forward end of the plunger, when in the closed position, is seated in and makes extensive surface contact with a conical bore element. A dispensing chamber is provided downstream of the forward end of the plunger.

Object and Summary of the Invention

Our European Patent Application No. 92301899.8 entitled "Air Activatable Polymerisable Compositions" describes novel compositions suitable for use as one component systems for forming polymers, requiring no primers. The compositions are useful as adhesives, sealants, surface coatings, moulding resins and composite matrices, for example. These compositions are particularly suitable for use as thread locking compounds e.g. for cementing nuts to threaded shafts, bushes to bush housings and the like. A characteristic of these novel compositions is rapid curing on contact with even the least quantity of air. This characteristic is particularly useful for automated mass production assembly using robots, whereby a composition may be applied as an adhesive to bond two assembly components together, and little curing time is required, so that high production volumes may be achieved.

Attempts to apply the novel compositions using existing applicators have resulted in premature curing within the applicators, causing the applicators to become blocked, which is unacceptable for automated manufacture. The curing occurs because of the ingress of small quantities of air into the applicator, for example at joints or seals, through tubing with poor barrier properties, or through membranes such as bellows or diaphragms. Also, curing occurs in the applicator nozzle downstream of the valve, if the applicator includes this feature.

An object of the present invention is to provide an applicator suitable for application of the novel air activatable polymerisable compositions, in other words an applicator sealed to a very high degree against any ingress of air.

The invention provides an applicator for a liquid comprising:

a housing having a bore terminating at one end in an outlet aperture;

a plunger received in said housing bore and mounted for movement between an open (liquid application) position and a closed position, the rear end of the plunger projecting from the other end of the housing, the plunger including a longitudinal bore for supply of liquid to be applied, the plunger being provided with one or more ports through which liquid may flow from the bore of the plunger into the bore of the housing, so arranged that when the plunger is in the fully open position the bore of the housing and the bore of the plunger co-operate to provide a streamlined flow path;

means for moving the plunger between the closed position and the open position; and a seal between plunger and housing to prevent ingress of air;

characterised (a) in that the seal is a liquid barrier seal and (b) in that in the closed position a forward end of the plunger seals said housing outlet aperture, and in the open position the forward end of the plunger is retracted into the housing.

Preferably when the plunger is in the fully open position, said one or more ports at the forward end of the bore of the plunger lead into the rear end of the bore of the housing.

Preferably the applicator includes two further seals, one upstream and one downstream of the liquid barrier seal.

Preferably the downstream seal is a U-seal.

Preferably the U-seal incorporates a spring biassing the limbs of the U apart and the interior of the U is filled.

Preferably the outlet aperture is at the end of a tapering conical region of the bore of the housing and the plunger carries a conical forward tip of slightly smaller conical angle.

Preferably the means for moving the plunger to the open position is a pneumatic drive system.

Preferably the plunger includes a flange on which the pneumatic system may operate.

The plunger may be moved to the closed position by the pneumatic drive system or by a restoring spring.

Preferably the plunger is integrally formed.

Preferably the ports comprise a plurality of radial ports at equal angles.

Preferably surfaces of the components which in operation are contacted by liquid adhesive are made of a material having a low adhesion to cured air activatable adhesive, for example plastic.

Preferably components which in operation are contacted by liquid adhesive are made of polyacetal.

In one preferred construction of applicator, in the closed position the forward end of the plunger projects through and beyond the outlet aperture.

In an alternative preferred construction, the forward end of the plunger is frusto conical, the outlet aperture is circular, and in the closed position the forward end of the plunger seats flush in the outlet aperture.

BRIEF DESCRIPTION OF DRAWINGS

The invention will now be described more particularly with reference to the accompanying drawings which show, by way of example only, two constructions of applicator according to the invention. In the drawings.

Detailed Description of Preferred Embodiments

Referring initially to FIGS. 1 to 6, the first construction of applicator consists of two principal components, a housing and a plunger, and these are described in the following paragraphs.

Figure 1:
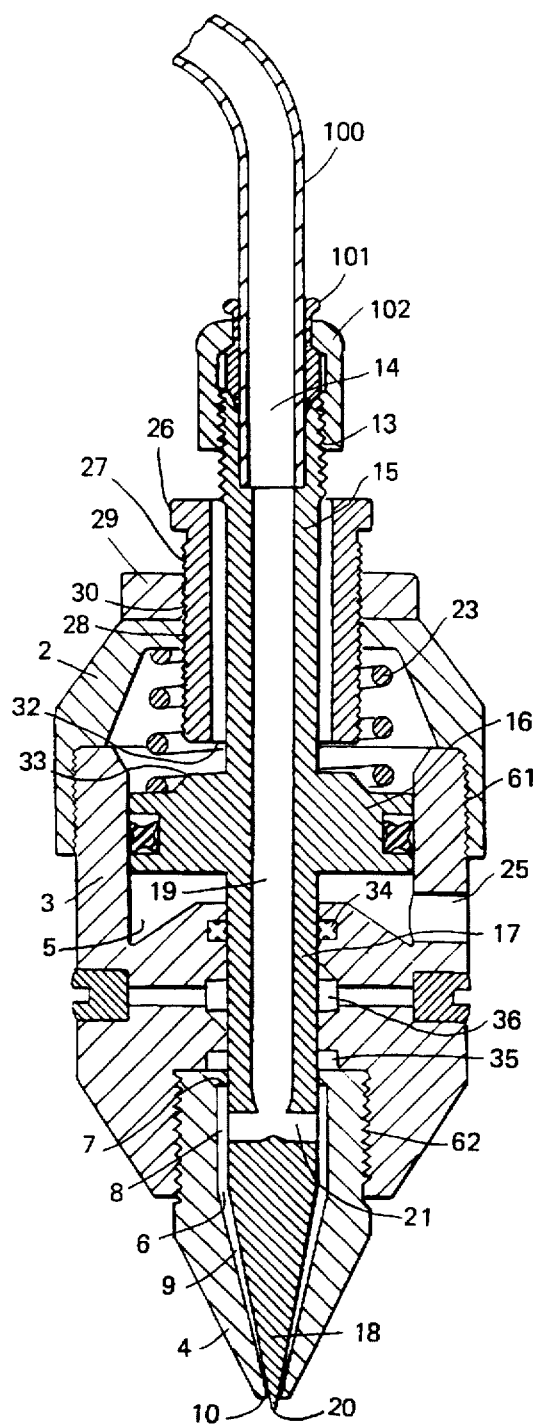
FIG. 1 is a sectional elevation of the first construction of applicator in the closed (non-application) state.
Figure 2:
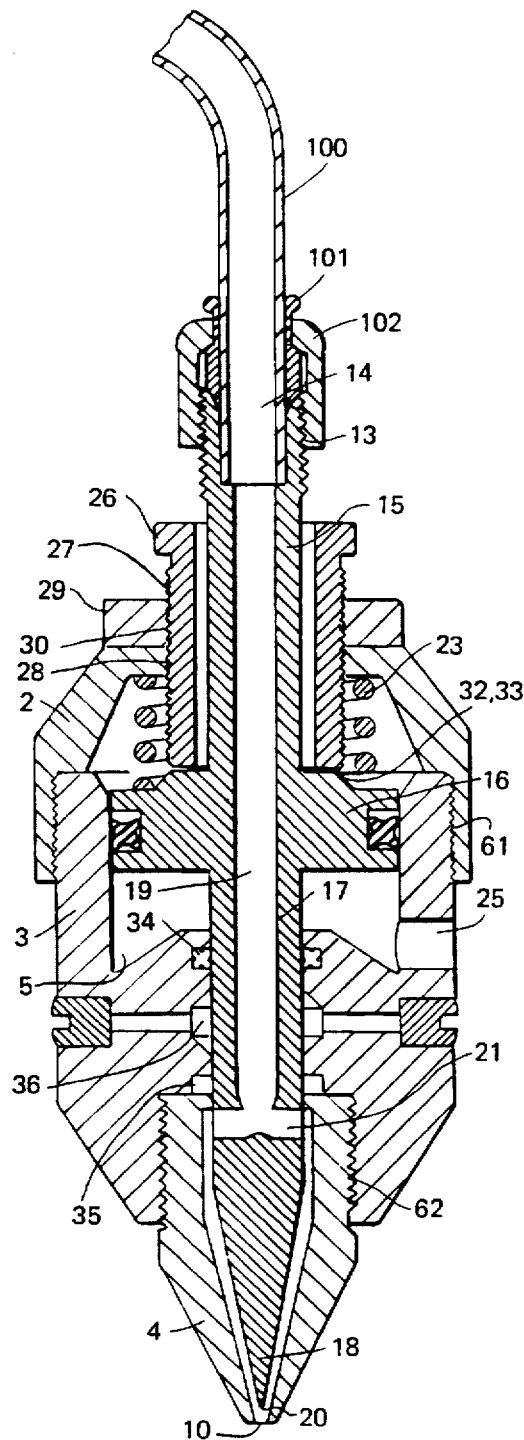
FIG. 2 is a similar view, but showing the applicator of FIG. 1 in the open (application) state.

Referring particularly to FIGS. 1 and 2, the housing consists of three housing-components 2, 3 and 4. Housing components 2 and 3 define a chamber 5. Housing component 3 includes an upper bore which together with housing component 2 defines the aforementioned chamber, a lower bore for receiving housing component 4, and these two bores are connected by a bore of smaller diameter. Housing component 4 defines a longitudinal bore 6 (best seen in FIGS. 3 and 4) including shoulder 7, uniform diameter part 8, tapering conical region 9 and outlet aperture 10. Housing components 2, 3 are screw threadingly engaged by screw threading 61 and housing components 3, 4 are screw threadingly engaged by screw threading 62.

The plunger is integrally formed, and includes a plunger head 13 and socket 14, an upper portion 15, a flange 16 located in chamber 5 and dividing the latter into upper and lower regions, a lower portion 17, and a conical end region 18 finishing in a tip 20. The plunger includes a longitudinal bore 19, extending from the plunger head 13 along the length of the plunger to a manifold 21 communicating with the longitudinal bore 6 of the housing. For ease of illustration in the drawings, the manifold 21 is shown in a configuration consisting of two ports diametrically opposite one another (e.g. 180° apart). More preferably, however, the manifold comprises three ports at 120° intervals.

The plunger is mounted to the housing for movement between the position shown in FIG. 1 (hereinafter the "closed" position) in which the end of the tip 20 of the plunger projects through and closes the outlet aperture 10 and the position shown in FIG. 2 (hereinafter the "open" position) in which the plunger is withdrawn and the outlet aperture 10 is open. A compression spring 23 housed in the upper part of chamber 5 biasses the plunger downwardly as seen in the drawings towards the closed position. A pneumatic drive (not shown) may be operated to drive compressed air via inlet 25 into the lower part of the chamber 5 below the flange 16, so as to thereby cause the plunger to move upwardly under the influence of the pneumatic pressure against the bias of the compression spring 23. The purpose of flange 16 is to provide an extended effective area on which the pneumatic pressure can operate.

A stroke adjuster 26 is provided for adjusting the stroke of the plunger and thereby adjusting the flow rate of the liquid adhesive. The stroke adjuster 26 is in the form of a collar provided with external screw threading 27 for co-operation with internal screw threading 28 on housing component 2 to allow the position of the stroke adjuster 26 to be set relative to housing component 2. A locking mechanism for the stroke adjuster 26 is provided by the stroke lock nut 29. The stroke lock nut 29 is provided with internal screw threading 30 for co-operation with screw threading 27 to allow the stroke adjuster 26 to be locked in position by screwing the stroke lock nut 29 against housing component 2. The lower edge 32 of the stroke adjuster 26 forms an upper stop for the top surface 33 of the flange 16 of the plunger, limiting upward movement.

Figure 3:
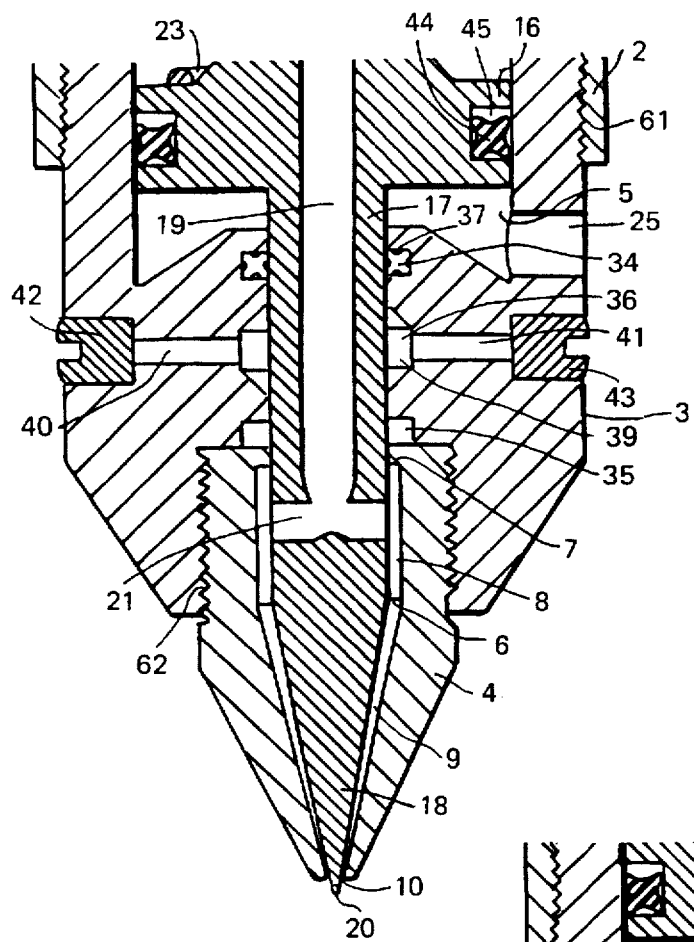
FIGS. 3 and 4 corresponds to FIGS. 1 and 2 respectively, but are on a larger scale, and illustrate the lower part of the applicator.
Figure 4:
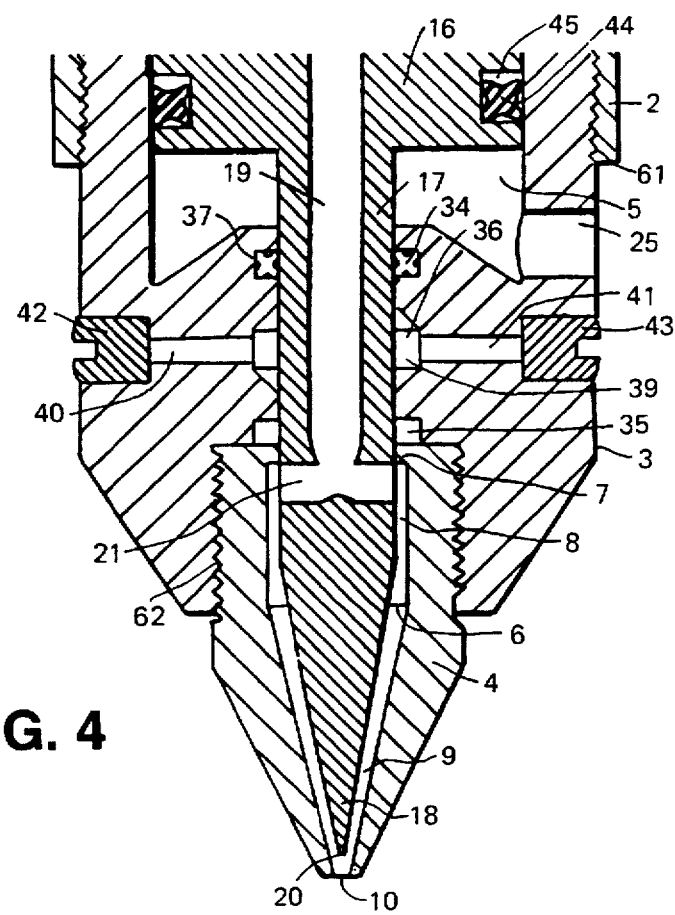
Figure 5:
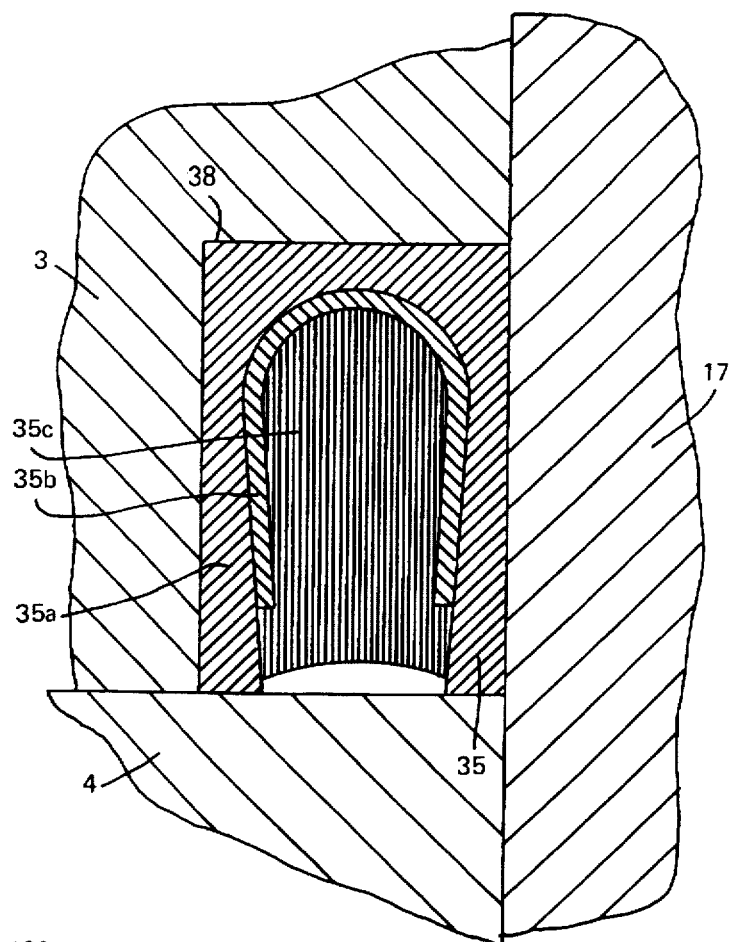
FIG. 5 shows a detail of FIGS. 3 and 4 on a still larger scale.

Referring now to FIGS. 3, 4 and 5, an airtight seal arrangement is provided between housing component 3 and the uniform diameter section 17 of the plunger, and the purpose of this seal arrangement is to prevent any air from the chamber 5, particularly air under pressure from the pneumatic system, coming into contact with liquid adhesive contained in the bores 19 and 6 and the manifold 21. The seal arrangement comprises three seals, an upper seal 34, a lower seal 35, and a central seal 36.

The upper seal 34 is an O-ring of star shaped cross section known as an x-ring or lobed ring, seated in a groove 37 in housing component 3. The x-ring 34 is flexible and during assembly of the applicator is inserted into the groove 37 before the plunger is placed in position.

The lower seal 35, illustrated on a larger scale in FIG. 5, is an annular seal of the type known as a U-seal. The U-seal 35 is of high density polyethylene 35a which has low adhesion to cured adhesive. The U-seal 35 includes an internal U-shaped metal spring 35b to bias the two limbs apart. The U-seal 35 is filled with silicone 35c so as to eliminate any dead space and also to isolate the metal 35b. The U is inverted, that is to say the mouth of the U faces downwardly as seen in the drawings. The seal 35 is seated in shoulder 38 in housing component 3 and substantially fills the shoulder so that no dead space is present. During assembly, because the U-seal 35 is fairly rigid, it is put in position before housing components 3, 4 are joined to one another.

The central seal 36 is a liquid barrier seal. The liquid must not react with the air activatable liquid adhesive. Liquid paraffin has been found to be suitable. The liquid paraffin is contained in sealing chamber 39. The chamber 39 extends circumferentially around the lower portion 17 of the plunger. A profile or section of the chamber 39 has a sloped roof, a vertical wall and a sloped floor, so that overall the chamber has an annular shape with a frusto-conical roof and a frusto-conical floor. Paraffin is introduced through two diametrically opposed inlets 40, 41 which are then sealed by two grub screws 42, 43. The provision of a liquid barrier seal has been found to be particularly effective in preventing curing on the plunger in the area of the lower seal 35, thus preventing seizing of the applicator.

None of the seals 34, 35, 36 for preventing ingress of air into the bores 6, 19 is of the bellows or diaphragm type, which would be constructed of thin flexible material which might be permeable to air and which might become worn through use. Instead, all three seals 34, 35, 36 are "sliding" seals, that is to say one component (the plunger) slides past the seals which remain stationary relative to the other component (the housing).

Still referring to FIGS. 3 and 4, the applicator also includes a further, much larger, seal 44 in the form of a lobed ring contained in a groove 45 in the circumferential wall of the flange 16 to prevent air under pressure in the lower part of chamber 5 below the flange 16 from leaking past the edge of the flange 16 upwardly to the upper part of chamber 5 above the flange 16 and thus adversely affecting the operation of the applicator.

Figure 6:
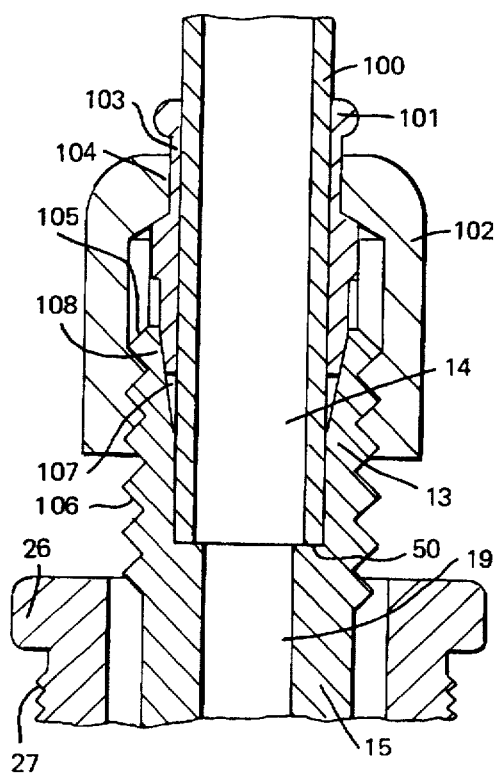
FIG. 6 corresponds to FIG. 1, but is on a larger scale and illustrates the upper part of the applicator of FIG. 1.

Referring now to FIG. 6, in preparation for use, the socket 14 in the head 13 of the plunger receives the free end of a hose 100. An air-tight connection is provided by means of a compression fitting comprising a ferrule 101 and nut 102 and this connection is described in more detail in the following paragraph. The hose 100 is connected to an external reservoir (not shown) containing an air activatable polymerisable composition in liquid form and under pressure. As shown, the hose 100 consists of one quarter inch (6.3 mm) diameter polyethylene tubing. The walls of the polyethylene tubing are sufficiently thick and/or dense as to avoid or preclude transmission of oxygen through the wall surface. The internal diameter of the socket 14 is the same as the external diameter of the hose 100. The socket 14 receives the end of the hose 100 which abuts the shoulder 50 at the bottom of the socket 14. The internal diameter of the bore 19 is similar to, preferably the same as, the internal diameter of the hose 100. Thus the connection is secure and permits streamlined flow. The longitudinal bore 19 of the plunger and the communicating longitudinal bore 6 of the housing are purged using inert gas so that all traces of air are removed.

Still referring to FIG. 6, ferrule 101 includes a narrow neck region 103 and nut 102 includes a collar region 104 which is retained in this neck region so that the nut 102 is held captively but loosely to the ferrule 101. To make the air tight connection, the ferrule 101 and captive nut 102 are threaded loosely onto the free end of the hose 100 which is then inserted into the socket 14 of the plunger. The ferrule 101 and nut 102 are then pushed downwardly until internal screw threading 105 on the nut 102 engages external screw threading 106 provided at the top of the plunger. The nut 102 is then screwed downwardly causing the ferrule 101 to be driven downwardly. The wedge shaped lower rim 107 of the ferrule 101 overlaps, engages and tightens against the wedge shaped upper rim 108 of the plunger and, in the latter half of the action of tightening of the screw 102, the rim 107 of the ferrule 101 is distorted radially inwardly to tightly engage the hose 100. As shown in FIG. 6, the screw 102 has been tightened only about half way and the distortion has not yet taken place.

Referring now to FIGS. 1 and 2, in use the plunger is normally in the closed position as shown in FIG. 1, and in this position no liquid flow takes place. The applicator is moved, for example by means of a robot (not shown), into intimate engagement with a work surface (not shown) to which the liquid is to be applied. The pneumatic system (not shown) is operated, for example, as part of an automated system, to move the plunger relative to the housing against the bias of the compression spring 23 to the open position shown in FIG. 2. The liquid, which is under pressure from the reservoir, is dispensed through the outlet aperture 10 and onto the work surface. The pneumatic pressure is released, and the plunger returns under the action of the compression spring 23 to the closed position, so that no further flow takes place. It will be appreciated that in the applicator of the invention, the plunger is moved in the upstream direction to open the outlet 10, and a downstream chamber or nozzle is unnecessary. Thus all of the liquid adhesive is sealed off from the atmosphere and maintained under pressure. The plunger may be reciprocated to dispense liquid dropwise, or may be held in the open position to dispense a continuous stream of liquid.

The flowpath in the interior of the applicator is streamlined, and does not include any dead spaces. The liquid within the applicator undergoes a corresponding streamlined flow. In particular it will be noted with reference to FIG. 2 that when the plunger is moved to the fully open position, the upper surface of the manifold 21 is level with the upper end of the longitudinal bore 6.

The components of the applicator are, insofar as possible, thick and of dense material to prevent air permeating through the components.

All of the surfaces which are contacted by the liquid are made from plastics, or alternatively are made from a material to which the cured adhesive has a low adhesion, so that in the event of any curing taking place and any consequent bonding of components, the bond may more easily be broken. This feature is particularly important in the region of the outlet aperture 10 where bonding may take place due to contact between the liquid and air arising during operation of the applicator.

Housing component 2, stroke adjuster 26 and stroke lock nut 29 which do not come in contact with liquid adhesive are preferably made of aluminium which is light and strong. The aluminium may be anodized to enhance its external appearance. Housing components 3, 4 and the plunger which are contacted by the liquid are made of polyacetal which has a low adhesion to the cured adhesive. Alternatively the last mentioned components may be made of aluminium coated with polytetrafluoroethylene (PTFE).

As best seen in FIGS. 3 and 4, the plunger tapers in region 18 towards its tip 20, the bore 6 of the housing also tapers, there is a slight difference between the angles of taper, so that in the closed position shown in FIG. 3 the tip 20 of the plunger projects through and beyond the outlet aperture 10, the conical end region 18 of the plunger contacts the conical wall of the bore 6 over an annulus of contact at the outlet aperture thereby sealing the outlet aperture 10, and within the bore 6 there is a gap 60 between the conical end region 18 of the plunger and the conical wall of the bore 6, the width of the gap 60 increasing in the upstream direction. If this gap 60 did not exist, if instead the conical end region 18 of the plunger seated exactly into the conical region of the bore 6 of the housing, there would be a risk that bonding might take place over a large area of mutual contact, and the applicator might seize up. By providing tapering gap 60, contact and bonding take place only over a small area. Any bond which occurs can be broken. The non-adhesive properties of the contact surfaces and the provision of the flange 16 to increase the pneumatic force on the plunger are helpful in breaking any bond. A larger angle, while further reducing the contact and bond area, might introduce non-streamlined flow.

Figure 7:
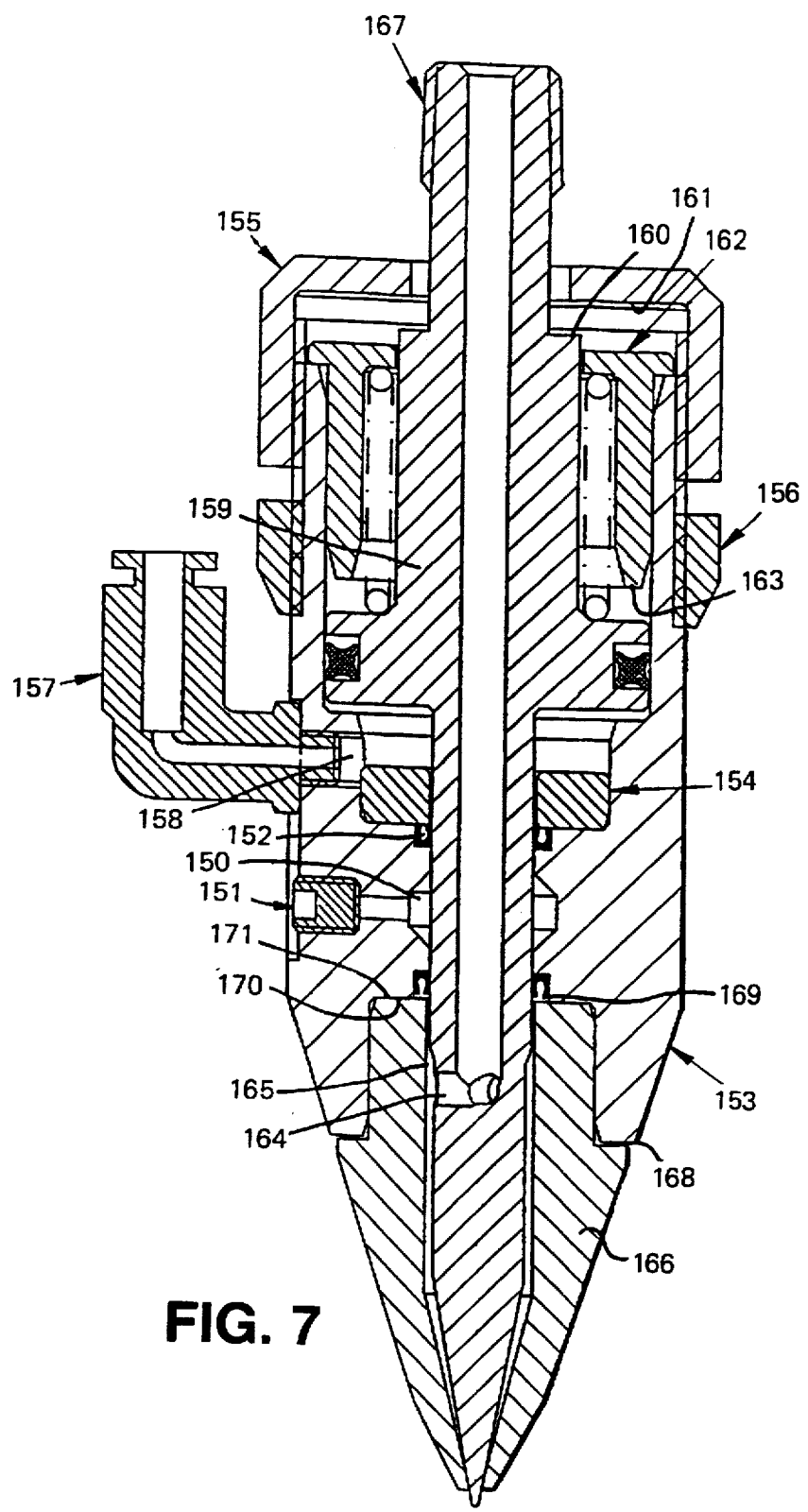
FIG. 7 is a sectional elevation of the second construction of applicator in the closed (non-application) state.

Referring now to FIG. 7, the second construction of applicator includes many components and features in common with the first construction of applicator shown in FIGS. 1 to 6. Accordingly, only the differences are described below.

In the second construction the liquid barrier seal 150 has just one liquid inlet 151.

The upper seal is a U-seal 152 with an upwardly facing mouth. To facilitate fitting the U-seal 152, the central housing component is in two parts 153, 154.

The stroke adjustment mechanism comprises a stroke adjuster 155 and a locking ring 156. When the stroke adjuster 155 and locking ring 156 butt against one another, the circumferential surfaces thereof are flush with one another. Overall, the stroke adjustment mechanism of the second construction is more ergonomic than the stroke adjustment mechanism of the first construction. In operation of the applicator, air is driven from a pneumatic system (not shown) through pneumatic connector 157 into chamber 158, causing the plunger 159 to retract to the "open" position. As in the first construction, the upward movement of the plunger 159 is limited by engagement of the shoulder 160 of the plunger against the bottom surface 161 of the stroke adjuster 155, the position of which is adjustable.

The second construction includes an additional feature, not present in the first construction, namely a means for limiting the stroke adjustment to a predetermined maximum, so as to avoid the plunger 159 being retracted to such an extent as to expose and compromise the seals. The means consists of a collar 162 which is stationary. The lower edge 163 of the collar 162 provides a stationery stop for the plunger 159 and the lower edge 163 of the collar 162 thus sets the maximum stroke adjustment.

In the second construction of applicator, the diameter of the plunger 159 tapers in the region immediately above the manifold 164, and the diameter of the bore 165 is constant in the upper region thereof. This modified geometry eliminates any risk of a sharp edge on the plunger 159 causing damage to a seal.

The lower housing component 166, the two parts of the central housing component 153, 154 and the collar 162 are a press fit together to simplify manufacture and assembly. As may be seen in FIG. 7, there is a small gap 168 between the lower housing component 166 and the lower part 153 of the central housing component. The purpose of the gap 168 is to allow sufficient tolerance to ensure firm sealing engagement between the two aforementioned components in the region of the lower seal 169, in particular to ensure engagement of the two opposed surfaces 170 and 171, thereby insofar as possible preventing any leakage of adhesive into a dead space.

The applicator is intended to be used to apply any one of a family of adhesives, the different family members having different viscosities. To allow for a range of viscosities, the applicator is provided with two alternative connectors (not shown) for attachment to the upper end thereof. Both connectors are adapted to be screw threadedly connected to external screw threading 167 at the top of the applicator. The two connectors differ from one another in that each is intended to receive a different diameter of hose (not shown) so that adhesives of differing viscosities may be introduced under pressure into the applicator.

In an alternative construction (not shown) the end region of the plunger, instead of being conical, is frusto-conical and seats flush into the outlet aperture 10.

In an alternative construction (not shown), the plunger is driven in both directions by pneumatic pressure. The upper part of the chamber 5 is not provided with a spring, but is instead provided with an inlet port for pneumatic pressure as well as an associated seal. The advantage of this arrangement is that the pneumatic pressure may act more quickly than the spring which it replaces.

We claim:

1. An applicator for a liquid comprising:

a housing having a bore terminating at one end in an outlet aperture;

a plunger received in said bore and mounted for movement between an open position and a closed position, the rear end of the plunger projecting from the other end of the housing, the plunger including a longitudinal bore for supply of liquid to be applied, the plunger being provided with at least one port through which liquid may flow from the bore of the plunger into the bore of the housing, so arranged that when the plunger is in the fully open position the bore of the housing and the bore of the plunger co-operate to provide a streamlined flow path;

means for moving the plunger between the closed position and the open position; and a seal between plunger and housing to prevent ingress of air;

wherein (a) the seal includes a barrier seal comprised of a liquid and (b) when in the closed position a forward end of the plunger seals said housing outlet aperture, and when in the open position the forward end of the plunger is retracted into the housing.

2. An applicator according to claim 1 in which, when the plunger is in the fully open position, said one or more ports at the forward end of the bore of the plunger lead into the rear end of the bore of the housing.

3. An applicator according to claim 1 including two further seals, one upstream and one downstream of the liquid barrier seal.

4. An applicator according to claim 3 in which the downstream seal is a U-seal.

5. An applicator according to claim 4 in which the U-seal incorporates a spring biassing the limbs of the U apart and the interior of the U is filled.

6. An applicator according to claim 1 in which the outlet aperture is at the end of a conical region of the bore of the housing and the plunger carries a conical forward tip of slightly smaller conical angle.

7. An applicator according to claim 1 in which the means for moving the plunger to the open position is a pneumatic drive system.

8. An applicator according to claim 7 in which the plunger includes a flange on which the pneumatic system may operate.

9. An applicator according to claim 7 in which the means for moving the plunger to the closed position is a pneumatic drive system.

10. An applicator according to claim 7 in which the means for moving the plunger to the closed position is a restoring spring.

11. An applicator according to claim 1 in which the plunger is integrally formed.

12. An applicator according to claim 1 in which said one or more ports comprise a plurality of radial ports at equal angles.

13. An applicator according to claim 1 in which surfaces of the components which in operation are contacted by liquid adhesive are made of a material having a low adhesion to cured air activatable adhesive, for example plastic.

14. An applicator according to claim 13 in which components which in operation are contacted by liquid adhesive are made of polyacetal.

15. An applicator according to claim 1 in which in the closed position the forward end of the plunger projects through and beyond the outlet aperture.

16. An applicator according to claim 1 in which the forward end of the plunger is frusto-conical, the outlet aperture is circular, and in the closed position the forward end of the plunger seats flush in the outlet aperture.

* * * * *